June 5, 1962 L. ZUMOFEN 3,037,898
MANUFACTURE OF FLOOR COVERINGS
Filed May 14, 1958
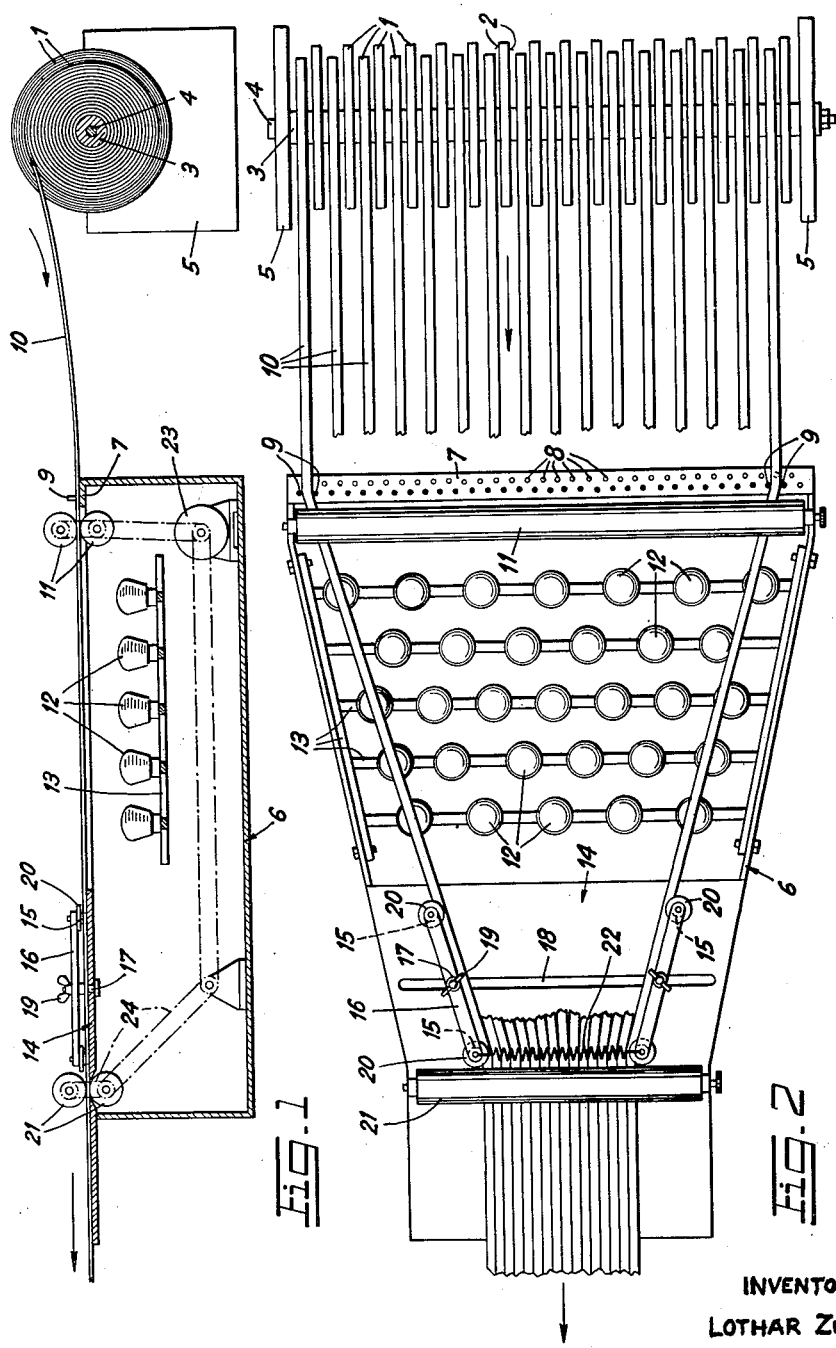
INVENTOR
LOTHAR ZUMOFEN
ATT'Y

United States Patent Office 3,037,898
Patented June 5, 1962

3,037,898
MANUFACTURE OF FLOOR COVERINGS
Lothar Zumofen, Brigue, Valais, Switzerland, assignor to Firma Wabor A.G., Reckingen, Valais, Switzerland
Filed May 14, 1958, Ser. No. 735,176
Claims priority, application Switzerland May 17, 1957
3 Claims. (Cl. 156—94)

This invention relates to floor coverings, and more particularly to methods and apparatus for manufacturing floor coverings from worn-out tires and the like.

Methods of making floor coverings from the carcass of old car tires by cutting the same into strips of equal cross-section and thereafter assembling and bonding the same in a continuous operation, have been proposed in the prior art. These prior art methods, however, involved such complicated procedures for joining the strips that they were not adopted on a commercial scale.

It is an object of the present invention to provide methods and apparatus for making floor coverings from used car tires wherein the joining of the strips into which the tires are cut, is simplified and perfected to a point where operations on an industrial scale, are rendered thoroughly feasible.

Other objects, and the manner in which the same are attained, will become apparent as the specification proceeds.

The invention contemplates cutting up the carcass of worn-out car tires, into strips of equal rectangular sections, thereafter winding up these strips into coiled bodies having flat, freely exposed sides, applying on these sides a binder of the kind activated by heating, unwinding simultaneously the strips deriving from a number of coiled bodies disposed adjacent to one another, for free rotary displacement, passing the strips thus unwound across a heating device and once they are heated, compressing the same laterally on a table whereby to force the sides of the strips provided with the now activated binder, into intimate contact with one another.

In the drawing attached to this application and forming part thereof, one embodiment of the invention is illustrated diagrammatically by way of example.

In the drawing,

FIG. 1 is a thoroughly diagrammatic longitudinal section, and

FIG. 2 an equally diagrammatic plan view of an apparatus designed for carrying out the method of the invention.

Used car tires are prepared for use according to the invention, by a mechanical removal of the inner and outer layers so as to expose the carcass wherein plies of fabric are embedded in rubber. From each of such carcass, by a machine operation involving for example, a helical cut performed while the carcass is rotated, a strip having a substantially uniform, flat rectangular section is obtained. Up to this point, the method corresponds to those proposed in the prior art.

According to the present invention, each strip which should be as long as possible, is beveled in a wedge-like manner, at both ends and tightly wound into a coiled body 1, which comprises flat, freely exposed sides 2 and preferably a hollow cylindrical hub 3. Each coiled body is temporarily protected from being unwound by means of wire or reuseable clamps.

Before or after a plurality of such coiled bodies 1 have been assembled on a shaft 4 mounted in a standard 5, the flat sides 2 of each coiled body are coated with one of the well known binders which are activated under the influence of heat, and which usually contains neoprene as the principal component. This coating is also applied to the beveled ends of the strips. Advantageously, the coating is permitted to dry, to a certain extent, in the ambient air.

At least that number of coiled bodies is supported adjacent to one another, for free rotary displacement on the shaft 4, as is needed so the sum of the widths of the individual strips, yields the overall width of the floor covering to be manufactured. It is also possible, however, to dispose adjacent to one another, a larger number of coiled bodies for the purpose of replacing a coiled body used up, i.e. entirely unwound in the course of the continuous assembly of the strips, by another coiled body disposed adjacent thereto. This arrangement permits to reduce the number of times new coiled bodies must be assembled on the shaft 4.

The apparatus for assembling and joining the strips into a floor covering having a continuous surface, comprises a trough-like chamber 6 which in plan view, takes about the form of a trapeze. On the top edge of the wall of the chamber adjacent to the standard 5 and forming the long base of the trapeze, a rod 7 comprising a series of holes 8 is mounted, and spacer pins 9 are secured in the holes 8 for the purpose of spacing the strips 10 unwound from the coiled bodies by a suitable lateral distance before they pass between two driving rollers 11 arranged adjacent to the rod 7. When the strips 10 have passed through these driving rollers 11, they pass across a battery of infra-red lamps 12 which are disposed on a grate 30 mounted in the trough 6. Once they have passed across the lamps 12, the strips traverse a table 14, mounted on the trough 6, the arrangement being such that they are laterally urged against one another with the result that their sides which are covered by the coating of binder activated during passage across the infra-red lamps 12, are forced into intimate contact with one another. For this purpose, two pairs of rollers 15 are provided which are supported on two two-armed levers 16, the pivots 17 of which are arranged for displacement in a transverse slot 18 provided in the table 14, and which can be secured by means of butterfly nuts, a draw spring 22 being provided to pull the ends of the two-armed levers 16, which are remote from the source of infra-red radiation, toward one another. On top of the shafts provided in the levers 16 for the rollers 15, plates or discs 20 are mounted which are designed to force at least the outermost strips 10, down on the table 14. For the same purpose, but effective on all the strips, another pair of driving rollers 21 is mounted adjacent the table 14. The material leaving the pair of driving rollers 21, no longer appears in the form of individual strips but constitutes a carpet having a continuous surface and a uniform width.

If the width of this carpet is to be varied, the pivots 17 are displaced in the transverse slot 18, and if necessary, the spring 22 is replaced by another spring of a different length. The driving rollers 11 and 21 are driven from an electric motor 23 by means of belt or chain transmissions 24, which may include step-down gearings and slip clutches (not shown) if desired.

In a finishing operation, the carpet subsequently passes in a separate machine (not shown), between two quickly rotating porcupine rollers which in a manner well known in the art, provide the flat surfaces with the proper nap or pile. At the end of this operation, the bonded seams or joints between the individual strips forming the carpet, can no longer be distinguished.

I wish it to be understood that I do not desire to be limited to the exact details of design, construction, and operation of the invention as exemplified in the foregoing specification and in the drawing, as numerous modifications within the scope of the following claims and involving no departure from the spirit of the invention nor any sacrifice of the advantages thereof, may occur to workers in this field.

I claim:
1. The method of manufacturing a floor covering from the carcasses of used car tires cut into strips of equal cross-section, comprising winding up said strips into coiled bodies having flat, freely exposed sides, coating said sides with a binder capable of being activated under the influence of heat, simultaneously unwinding the strips of a plurality of such coiled bodies which are disposed for free rotation adjacent to one another, passing the plurality of strips thus coated and unwound across a heater, and thereafter urging said strips toward one another whereby to force the sides of the strips coated with the now activated binder, into intimate contact with one another.

2. Apparatus for manufacturing a floor covering from the carcasses of used car tires cut into strips of equal cross-section, comprising arranged in series, a shaft for supporting for free rotary displacement, a plurality of reels of said strips, guide means for guiding the strips in mutually spaced, substantially parallel relationship, a first pair of driving rollers, a source of heat for activating a binder coating the sides of said strips, said driving rollers being arranged to pass said strips across said heat source, means including a spring for urging the strips toward one another in a direction parallel to the longitudinal axis of said shaft after passage across said heat source whereby to mutually bond said strips, and a second pair of driving rollers operating at the same speed as said first pair of driving rollers, for conveying the floor covering thus produced to a finishing operation.

3. The apparatus of claim 2, wherein the shaft is arranged for supporting spare reels adjacent to the reels first used in the apparatus, whereby on exhaustion of the first set of reels, the strips of the spare reels can be processed so as to render the operation continuous.

References Cited in the file of this patent

UNITED STATES PATENTS

| | | |
|---|---|---|
| 1,467,289 | Eames | Sept. 4, 1923 |
| 1,746,948 | King | Feb. 11, 1930 |
| 2,531,659 | Watson | Nov. 28, 1950 |
| 2,670,314 | Ungar | Feb. 23, 1954 |

FOREIGN PATENTS

| | | |
|---|---|---|
| 767,234 | Great Britain | Jan. 30, 1957 |